(12) United States Patent
Lee

(10) Patent No.: US 11,592,135 B2
(45) Date of Patent: Feb. 28, 2023

(54) FITTING FOR PREVENTING DISTORTION

(71) Applicant: Sang Seon Lee, Wonju-si (KR)

(72) Inventor: Sang Seon Lee, Wonju-si (KR)

( * ) Notice: Subject to any disclaimer, the term of this patent is extended or adjusted under 35 U.S.C. 154(b) by 73 days.

(21) Appl. No.: 16/744,970

(22) Filed: Jan. 16, 2020

(65) Prior Publication Data

US 2020/0240566 A1 Jul. 30, 2020

Related U.S. Application Data

(63) Continuation of application No. PCT/KR2019/007057, filed on Jun. 12, 2019.

(30) Foreign Application Priority Data

Jan. 25, 2019 (KR) .................. 10-2019-0010044
May 7, 2019 (KR) .................. 10-2019-0053041

(51) Int. Cl.
*F16L 9/133* (2006.01)
*F16L 43/00* (2006.01)
*F16L 23/032* (2006.01)

(52) U.S. Cl.
CPC ............ *F16L 43/008* (2013.01); *F16L 9/133* (2013.01); *F16L 23/032* (2013.01); *F16L 43/001* (2013.01); *F16L 2201/20* (2013.01)

(58) Field of Classification Search
CPC ....... F16L 43/008; F16L 9/133; F16L 43/001; F16L 2201/20; F16L 9/121; F16L 23/00; F16L 23/032; F16L 23/125; F16L 58/187; F16L 9/147; F16L 58/02; F16L 23/02; F16L 23/024; F16L 47/14

USPC ................ 285/55, 182, 238, 416, 415
See application file for complete search history.

(56) References Cited

U.S. PATENT DOCUMENTS

| 1,303,102 | A | * | 5/1919 | Monrath | 285/55 |
| 1,949,984 | A | * | 3/1934 | Walker | 285/55 |
| 3,206,530 | A | * | 9/1965 | Boteler | 285/55 |
| 4,633,913 | A | * | 1/1987 | Carty | |
| 4,733,889 | A | * | 3/1988 | Haines | 285/55 |
| 2009/0025815 | A1 | * | 1/2009 | Becks | |
| 2009/0174185 | A1 | * | 7/2009 | Ziu | F16L 9/147 |

FOREIGN PATENT DOCUMENTS

| CN | 205026235 U | * | 2/2016 |
| CN | 105587915 A | * | 5/2016 |
| GB | 2425815 A | * | 11/2006 |
| JP | 08-219335 A | | 8/1996 |
| JP | 2006307968 A | | 11/2006 |
| JP | 2009052623 A | | 3/2009 |
| JP | 2016-027271 A | | 2/2016 |
| JP | 2016027271 A | | 2/2016 |
| KR | 101320550 B1 | | 10/2013 |
| KR | 20180010058 A | | 1/2018 |
| KR | 1020180010041 A | | 1/2018 |
| KR | 20180064055 A | * | 6/2018 |

* cited by examiner

*Primary Examiner* — Zachary T Dragicevich
*Assistant Examiner* — William S. Choi

(57) ABSTRACT

Various fittings capable of preventing distortion are disclosed. The fitting comprises a metal member configured to have at least two sub metal members and a body. Here, the sub metal members are included in the body, and the body is formed of plastic.

7 Claims, 12 Drawing Sheets

FITTING FOR PREVENTING DISTORTION

CROSS-REFERENCE TO RELATED APPLICATIONS

This application is a continuation application of a PCT application filed on Jun. 12, 2019 and assigned Serial No. PCT/KR2019/007057, and which claims priority from Korean Patent Application No. 10-2019-0010044 filed with the Korean Intellectual Property Office on Jan. 25, 2019, Korean Patent Application No. 10-2019-0053041 filed with the Korean Intellectual Property Office on May 7, 2019. The entire disclosure of above patent applications is incorporated herein by reference.

TECHNICAL FIELD

The present disclosure relates to various fittings for preventing distortion.

BACKGROUND ART

Conventional fitting is formed of a metal. As a result, it is difficult to process the fitting and manufacturing cost of the fitting is very expensive.

SUMMARY

To solve problem of the prior arts, the disclosure is to provide various fittings capable of preventing distortion.

A fitting according to an embodiment of the disclosure includes a metal member configured to have at least two sub metal members; and a body. Here, the sub metal members are included in the body, and the body is formed of plastic.

A fitting according to an embodiment of the disclosure includes a metal member; and a body formed of plastic. Here, at least one hole in which melt plastic is filled when an insert molding is performed is formed on the metal member, and the metal member is included in the body through the insert molding.

A method of manufacturing a fitting, the method according to an embodiment of the disclosure includes surrounding an integral liner with sub metal members; and inserting a structure where the sub metal members surround the liner in melt plastic, so that the sub metal members are included in a body formed of plastic.

In a fitting of the disclosure, a metal member is included in a body formed of plastic. Accordingly, distortion may not be occurred to the fitting when the fitting is combined with a pipe or another fitting.

Additionally, the fitting of the disclosure is very excellent compared to a fitting formed of plastic, in view of strength.

BRIEF DESCRIPTION OF DRAWINGS

Example embodiments of the present disclosure will become more apparent by describing in detail example embodiments of the present disclosure with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

Hereinafter, embodiments of the disclosure will be described in detail with reference co accompanying drawings.

The disclosure relates to a fitting, and a metal member is included in a body formed of plastic. As a result, distortion may be prevented when the fitting is combined with a pipe or another fitting.

If the body is formed of a metal, strength of the body is excellent, and thus distortion is prevented. However, it is difficult to process the fitting to have desired shape and manufacturing cost of the fitting is very expensive.

If the body is formed of only plastic, it is easy to process the body and manufacturing cost gets lower. However, distortion may be occurred when the fitting is combined with a pipe or another fitting, and so the fitting may be broken down.

Accordingly, the disclosure provides a fitting for preventing distortion with low manufacturing cost and easy processing.

Figure 1:
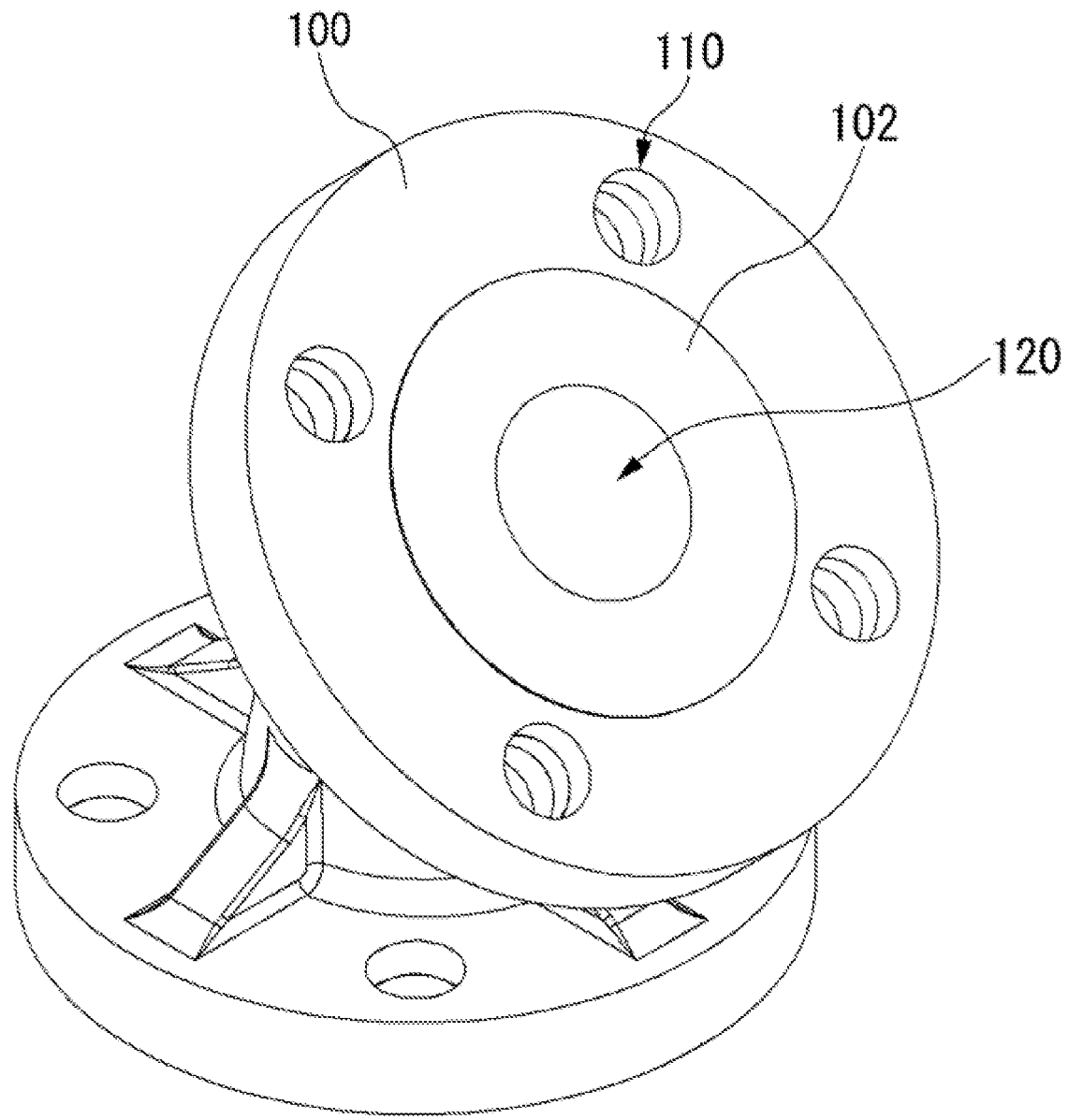
FIG. 1 and FIG. 2 are perspective views illustrating a 45° elbow structure according to an embodiment of the disclosure.
Figure 2:
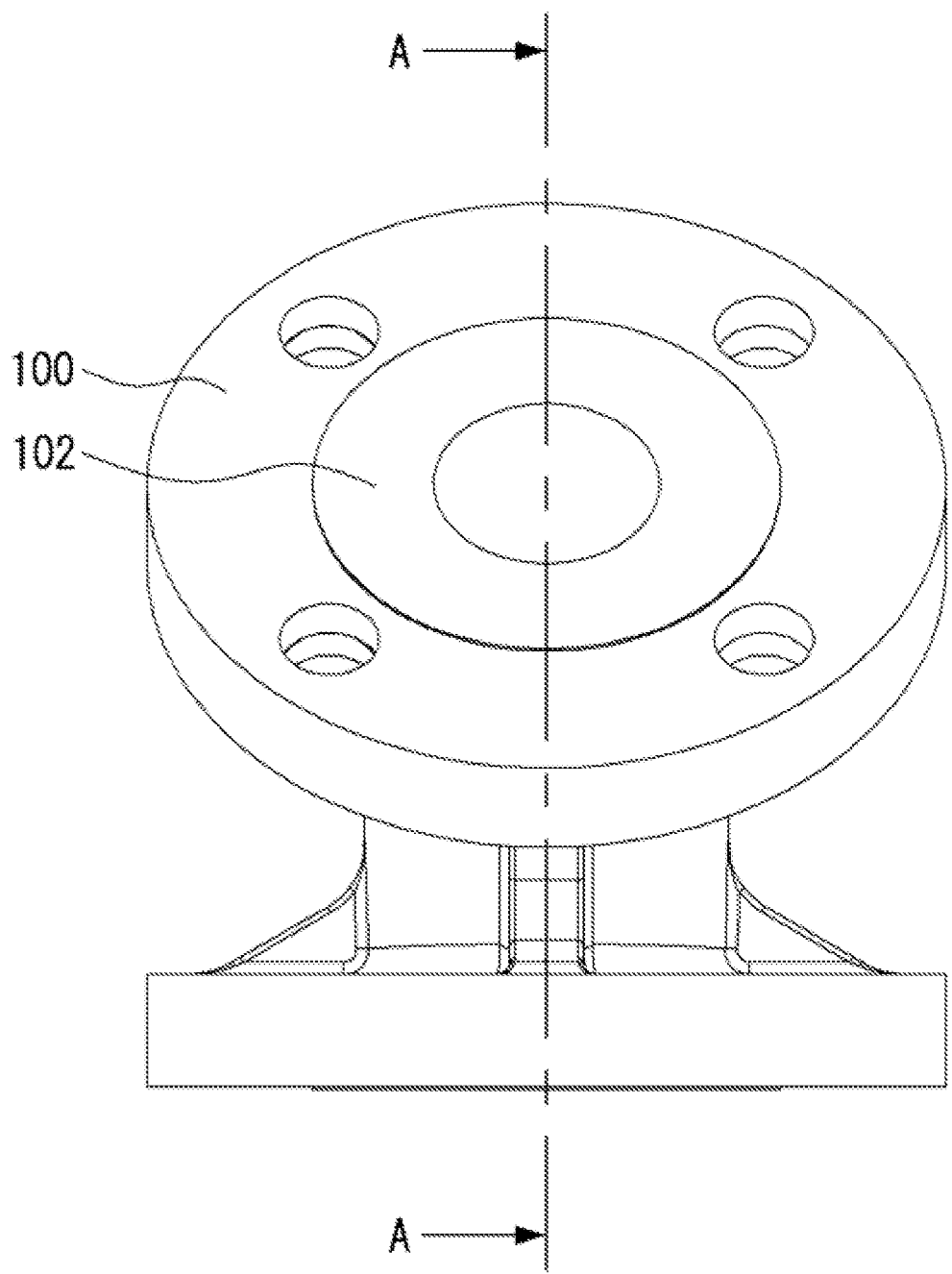
Figure 3:
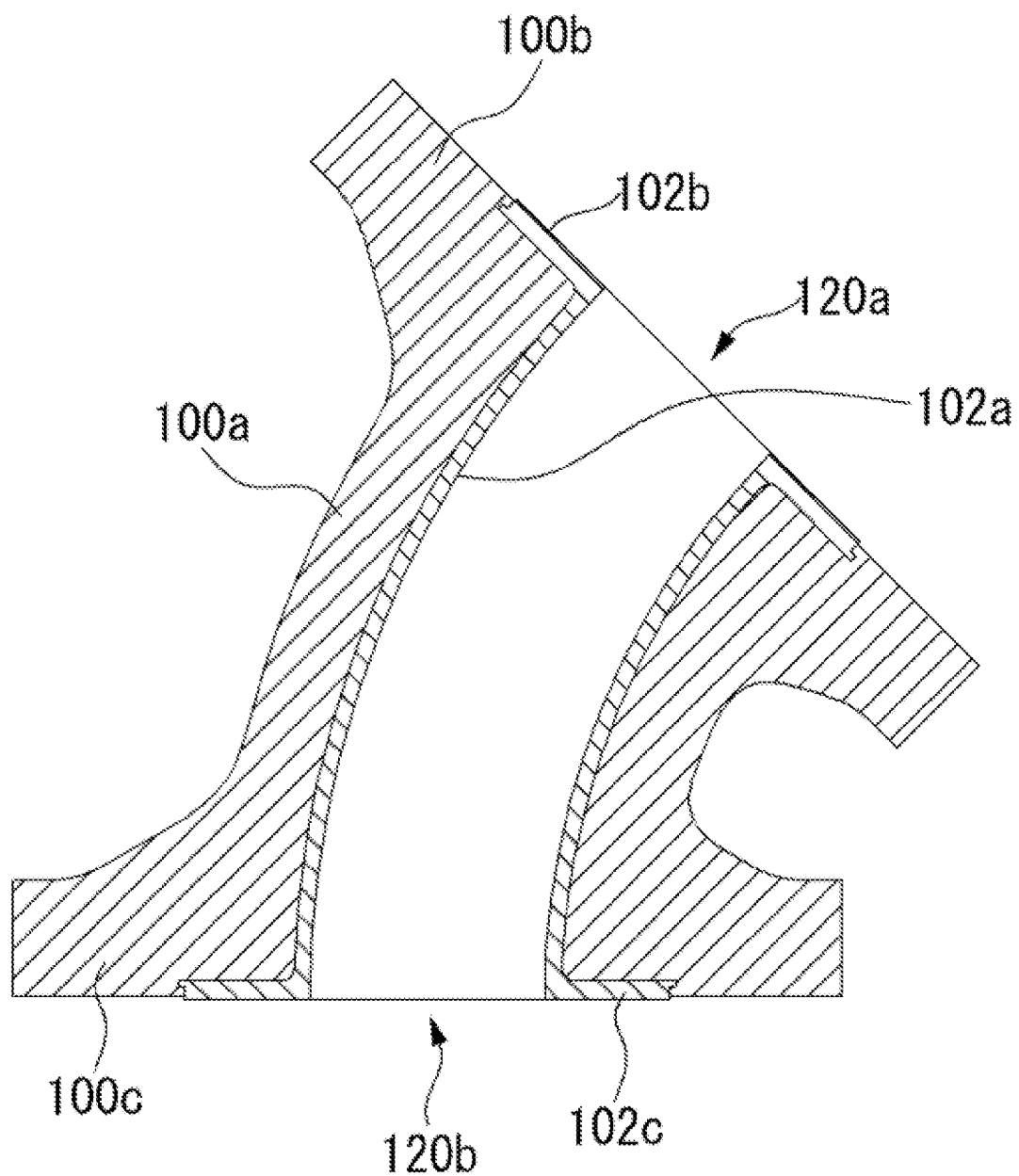
FIG. 3 is a sectional view illustrating a structure of a fitting taken along A-A line in FIG. 2.
Figure 4:
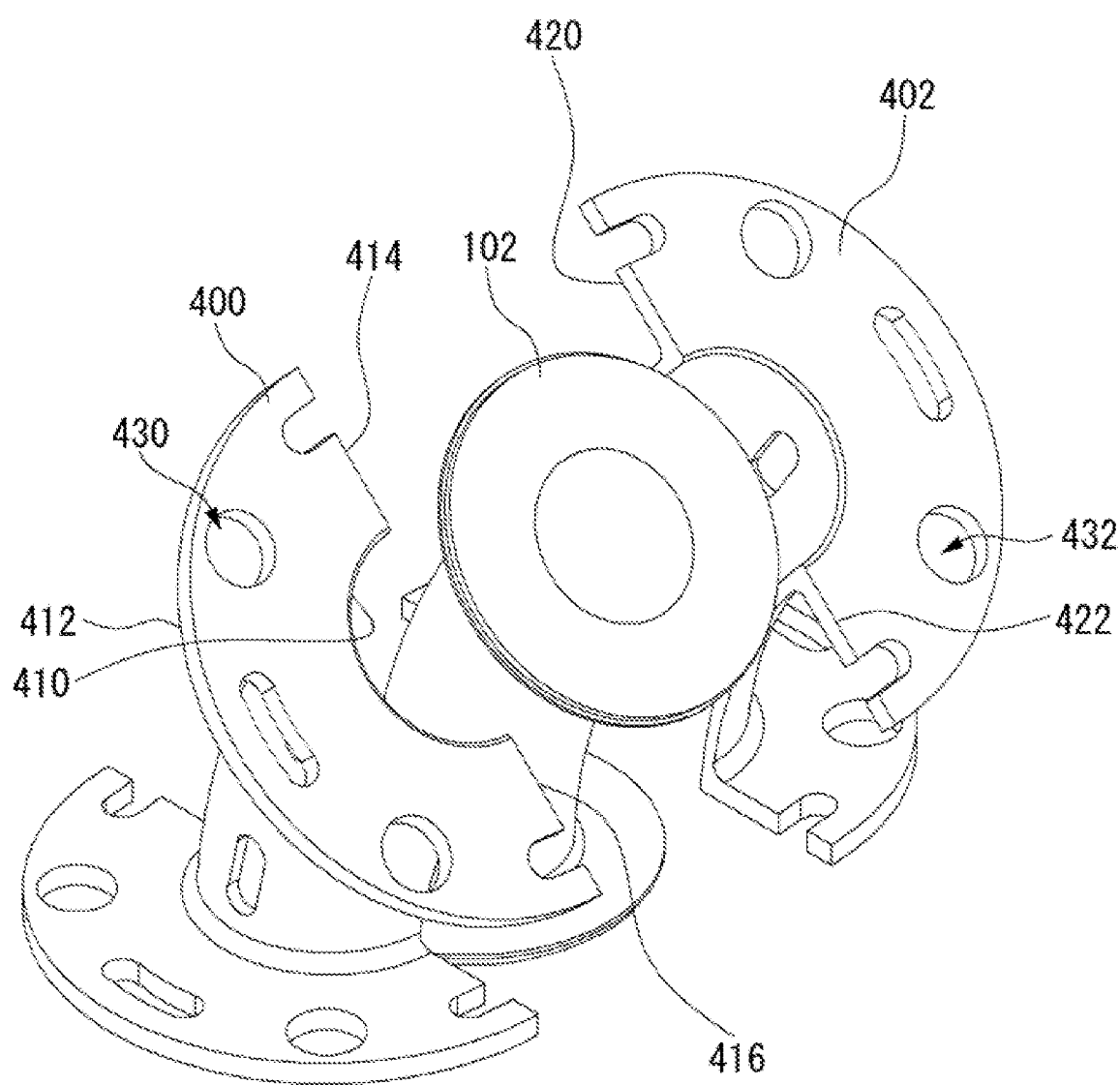
FIG. 4 is a view illustrating a combination process of a metal member in a fitting according to an embodiment of the disclosure.
Figure 5:
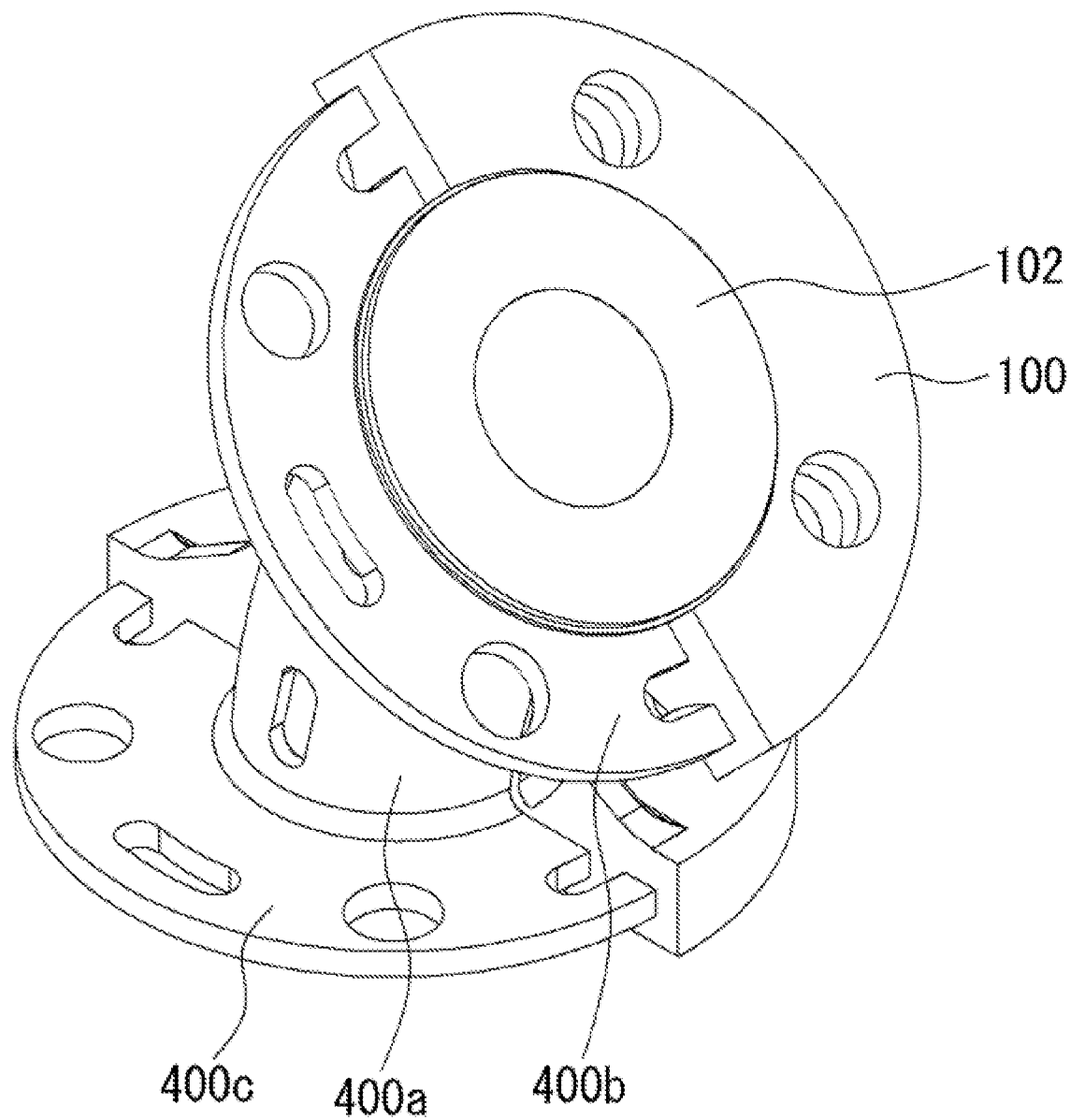
FIG. 5 is a view illustrating schematically a combination process of a body in a fitting according to an embodiment of the disclosure.
Figure 6:
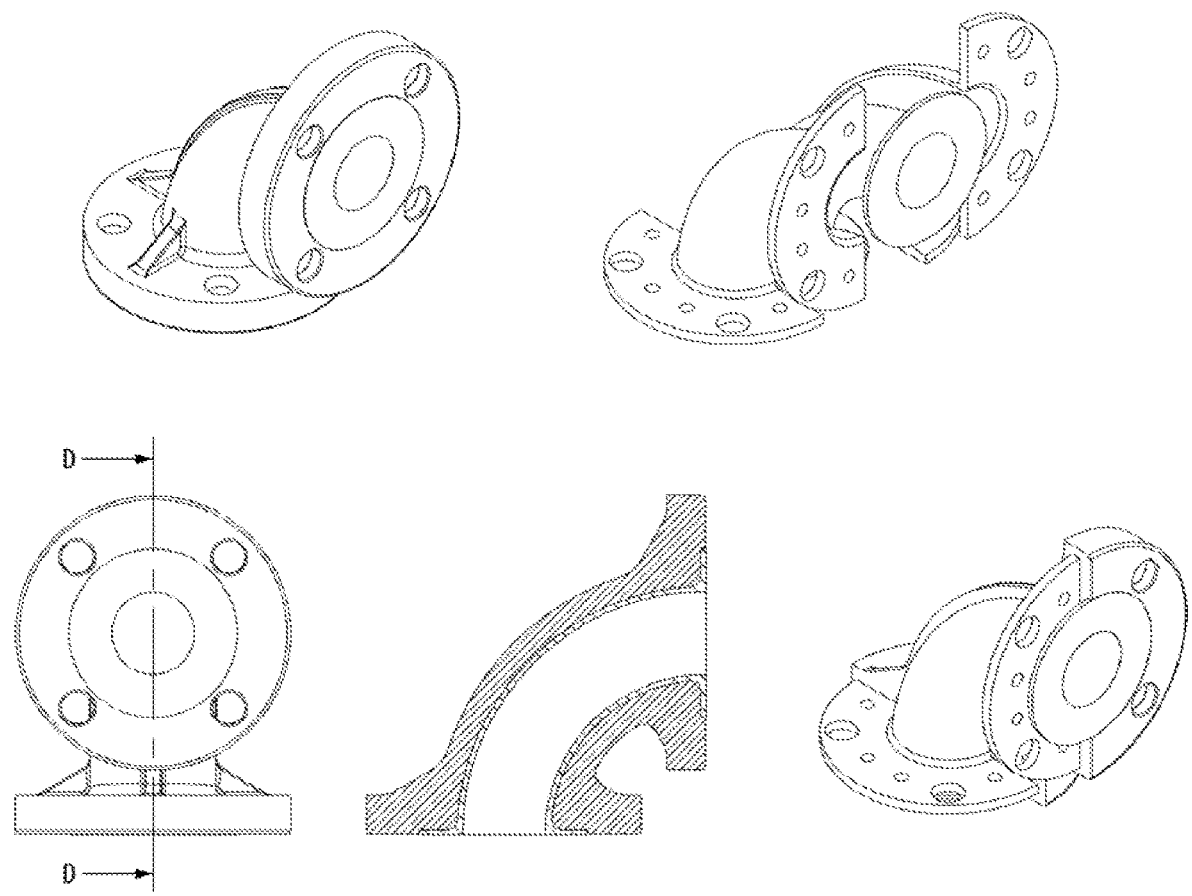
FIG. 6 is a view illustrating a fitting having 90° elbow structure according to an embodiment of the disclosure.

FIG. 1 and FIG. 2 are perspective views illustrating a 45° elbow structure according to one embodiment of the disclosure, FIG. 3 is a sectional view illustrating a structure of a fitting taken along A-A line in FIG. 2, and FIG. 4 is a view illustrating a combination process of a metal member in a fitting according to one embodiment of the disclosure. FIG. 5 is a view illustrating schematically a combination process of a body in a fitting according to one embodiment of the disclosure, and FIG. 6 is a view illustrating a fitting having 90° elbow structure according to one embodiment of the disclosure.

The fitting of the disclosure relates to a pipe fitting, means a pipe, another fitting, widely every device having a flange, e.g. a device combined with a piping such as a pipe, etc., and may be referred to as a piping combination device. Here, the pipe may be formed of plastic or metal, i.e. material of the pipe is not limited. The pipe includes every structure through which fluid flows.

In FIG. 1 to FIG. 5, the fitting of the present embodiment is an elbow fitting, and may includes a body 100, a liner 102 and a metal member having a first sub metal member 400 and a second sub metal member 402.

The body 100 may include a body member 100a, a first body flange member 100b and a second body flange member 100c, and it may be in a body.

The body 100 may cover the metal member and be formed of plastic. That is, the metal member is included in the body 100.

In one embodiment, the body 100 may be formed of a super engineering plastic or an engineering plastic. For example, the body 100 may be made up of a polyphenylene ethers resin composition including a polyphenylene ethers resin and a polystyrene resin. Of course, the body 100 may be formed of a polypropylene, a polyimide, a polysulfone, a poly phenylene sulfide, a polyamide imide, a polyacrylate, a polyether sulfone, a polyether ether ketone, a polyether imide, a liquid crystal polyester, a polyether ketone, etc. and their combination.

The body member 100a may have a streamlined shape. Here, the body member 100a may have 45° elbow structure shown in FIG. 3 or 90° elbow structure shown in FIG. 6. That is, curvature of the body member 100a may be variously modified as long as the body member 100a has the streamlined shape.

The first body flange member 100b is formed at one end part of the body member 100a, and it is combined with a pipe or another fitting.

In one embodiment, a hole 110 is formed on the first body flange member 100b, a hole is formed on a flange of the pipe, and the first body flange member 100b may be combined with the flange of the pipe by passing a fixing member such as a bolt through the hole 110 of the first body flange member 100b and the hole of the flange of the pipe. As a result, the fitting may be combined with the pipe. Of course, a process of combining the fitting with another fitting is also similar. The fitting of the disclosure may be combined with every device having a flange, and their combination process is similar to the above combination process.

The second body flange member 100c is formed at the other end part of the body member 100a, and it is combined with a pipe or another fitting. The combination process is similar to the combination process of the first body flange member 100b.

The liner 102 is formed in the body 100, and it may have a streamlined shape along a curve of the body 100.

In one embodiment, the liner 102 may be formed of a fluorine resin. The fluorine resin means every resin including fluorine in a molecule, and it includes a Polytetrafluoroethylene, PTFE, a Polychlorotrifluoroethylene PCTFE or a Perfluoroalkoxy alkane PFA, etc. This fluorine resin has excellent heat resistance, excellent chemical resistance, excellent electric insulation, small friction coefficient, and does not have adhesion.

The liner 102 may be an integral liner and include a liner body member 102a, a first liner flange member 102b and a second liner flange member 102c. A fluid flow space through which fluid flows may be formed in the liner 102. For example, fluid inputted through an inlet 120a flows to the outlet 120b through the fluid flow space 120, and then the fluid is outputted through the outlet 120b.

The liner body member 102a is formed in the body member 100a, and it may have a curved shape.

The first liner flange member 102b may have a width higher than the liner body member 102a and locate in the first body flange member 100b. One side of the first liner flange member 102b may be exposed outside.

The second liner flange member 102c may have a width higher than the liner body member 102a and locate in the second body flange member 100c. One side of the second liner flange member 102c may be exposed outside.

The metal member may surround the liner 102 as shown in FIG. 4 and FIG. 5 and be included in the body 100. Here, a whole of the metal member is surrounded by the body 100, and none part of the metal member may be exposed outside. That is, the liner 102 locates in the metal member, and the whole of the metal member may be included in the body 100.

In one embodiment, the metal member may include a first sub metal member 400 and a second sub metal member 402. For example, the metal member may include two sub metal members 400 and 402 having the same or similar structure. Here, the sub metal members 400 and 402 are separated.

The first sub metal member 400 may be in integral type, cover a half of the liner 102 and include a first sub body member 400a, a 1-1 sub flange member 400b and a 1-2 sub flange member 400c.

The first sub body member 400a may cover a half of the liner body member 102a and have a curved shape.

The 1-1 sub flange member 400b may be connected to an end part of the first sub body member 400a and be disposed just beneath the first liner flange member 102b. particularly, a groove curve line 410 formed at a center of the 1-1 sub flange member 400b may cover a half of the liner body member 102a just beneath the first liner flange member 102b, curvature of the groove curve line 410 being the same as or similar to that of the liner body member 102a.

In one embodiment, a width of the 1-1 sub flange member 400b is higher than that of the first liner flange member 102b. As a result, at least part of the 1-1 sub flange member 400b may be projected outside the first liner flange member 102b in a width direction while the 1-1 sub flange member 400b supports the first liner flange member 102b as shown in FIG. 5, when the 1-1 sub flange member 400b surrounds the liner body member 102a. Here, the first liner flange member 102b may be projected compared to the 1-1 sub flange member 400b in a longitudinal direction.

On the other hand, the 1-1 sub flange member 400b might surround directly the first liner flange member 102b. In this case, the fitting may have unstable structure because a space exists between the liner 102 and the metal member. Accordingly, it is effective that the 1-1 sub flange member 400b surrounds the liner body member 102a just beneath the first liner flange member 102b.

At least one hole 430 may be formed on the 1-1 sub flange member 400b, a fixing member passing through the hole 430. That is, the fixing member passes the hole 110 of a first body flange member 100*b* and the hole 430 of the 1-1 sub flange member 400*b* when the fitting is combined with the pipe.

The 1-2 sub flange member 400*c* may be connected to the other end of the first sub body member 400*a* and be disposed just beneath of the second liner flange member 102*c*. Particularly, a groove curve line formed at a center of the 1-2 sub flange member 400*c* may cover half of the liner body member 102*a* just beneath the second liner flange member 102*c*, wherein the groove curve line may have the same curvature as the liner body member 102*a* or similar curvature to the liner body member 102*a*.

In one embodiment, a width of the 1-2 sub flange member 400*c* is higher than that of the second liner flange member 102*c*. As a result, at least part of the 1-2 sub flange member 400*c* may be projected outside the second liner flange member 102*c* in a width direction while the 1-2 sub flange member 400*c* supports the second liner flange member 102*c* as shown in FIG. 5, when the 1-2 sub flange member 400*c* covers the liner body member 102*a*. Here, the second liner flange member 102*c* may be projected compared to the 1-2 sub flange member 400*c* in a longitudinal direction.

On the other hand, the 1-2 sub flange member 400*c* might surround directly the second liner flange member 102*c*. In this case, the fitting may have unstable structure because a space exists between the liner 102 and the metal member. Accordingly, it is effective that the 1-2 sub flange member 400*c* surrounds the liner body member 102*a* just beneath the second liner flange member 102*c*.

At least one hole may be formed on the 1-2 sub flange member 400*c*, a fixing member passing through the hole. That is, the fixing member passes through the hole of a second body flange member 100*c* and the hole of the 1-2 sub flange member 400*c* when the fitting is combined with the pipe.

The second sub metal member 402 may be in a body, surround the other half of the liner 102 and include a second sub body member, a 2-1 sub flange member and a 2-2 sub flange member.

The second sub body member may cover the other half of the liner body member 102*a* and have a curve shape.

The 2-1 sub flange member may be connected to an end part of the second sub body member and be disposed just beneath the first liner flange member 102*b*. Particularly, a groove curve line formed at a center of the 2-1 sub flange member may surround the other half of the liner body member 102*a* just beneath the first liner flange member 102*b*, wherein the groove curve line may have the same curvature as the liner body member 102*a* or similar curvature to the liner body member 102*a*.

In one embodiment, a width of the 2-1 sub flange member is higher than that of the first liner flange member 102*b*. As a result, at least part of the 2-1 sub flange member may be projected outside the first liner flange member 102*b* in a width direction while the 2-1 sub flange member supports the first liner flange member 102*b*, when the 2-1 sub flange member covers the liner body member 102*a*. Here, the first liner flange member 102*b* may be projected compared to the 2-1 sub flange member in a longitudinal direction.

On the other hand, the 2-1 sub flange member might cover directly the first liner flange member 102*b*. In this case, the fitting may have unstable structure because a space exists between the liner 102 and the metal member. Accordingly, it is effective that the 2-1 sub flange member surrounds the liner body member 102*a* just beneath the first liner flange member 102*b*.

At least one hole 432 may be formed on the 2-1 sub flange member, a fixing member passing through the hole 432. That is, the fixing member passes through the hole 110 of a first body flange member 100*b* and the hole of the 2-1 sub flange member when the fitting is combined with the pipe.

On the other hand, the 2-1 sub flange member may have a shape of doughnuts cut by half, end sections 420 and 422 except the groove curve line may be contacted with end sections 414 and 416 of the 1-1 sub flange member 400*b*. That is, the metal member may surround the liner 102 while the end sections 414 and 416 of the 1-1 sub flange member 400*b* are contacted with the end sections 420 and 422 of the 2-1 sub flange member. Here, the 1-1 sub flange member 400*b* has a shape of doughnuts cut by half.

The 2-2 sub flange member may be connected to the other end of the second sub body member and be disposed just beneath the second liner flange member 102*c*. Particularly, a groove curve line formed at a center of the 2-2 sub flange member may surround the other half of the liner body member 102*a* just beneath the second liner flange member 102*c*, wherein the groove curve line may have the same curvature as the liner body member 102*a* or similar curvature to the liner body member 102*a*.

In one embodiment, a width of the 2-2 sub flange member is higher than that of the second liner flange member 102*c*. As a result, at least part of the 2-2 sub flange member may be projected outside the second liner flange member 102*c* in a width direction while the 2-2 sub flange member supports the second liner flange member 102*c*, when the 2-2 sub flange member surrounds the liner body member 102*a*. Here, the second liner flange member 102*c* may be projected compared to the 2-2 sub flange member in a longitudinal direction.

On the other hand, the 2-2 sub flange member might cover directly the second liner flange member 102*c*. In this case, the fitting may have unstable structure because a space exists between the liner 102 and the metal member. Accordingly, it is effective that the 2-2 sub flange member surrounds the liner body member 102*a* just beneath the second liner flange member 102*c*.

At least one hole may be formed on the 2-2 sub flange member, a fixing member passing through the hole. That is, the fixing member passes through the hole of a second body flange member 100*c* and the hole of the 2-2 sub flange member when the fitting is combined with the pipe.

On the other hand, the 2-2 sub flange member may have a shape of doughnuts cut by half, end sections except the groove curve line may be contacted with end sections of the 1-2 sub flange member 400*c*. That is, the metal member may surround the liner 102 while the end sections of the 1-2 sub flange member 400*c* are contacted with the end sections of the 2-2 sub flange member. Here, the 1-2 sub flange member 400*c* has a shape of doughnuts cut by half.

In a manufacturing process, the metal member may be formed in the body 100 by using an insert molding. Particularly, the metal member may be included in the body 100 and the liner 102 may be formed in the metal member by insert-molding a structure where the sub metal members 400 and 402 surround the liner 102 in plastic which is material of the body 100.

At least one hole other than the hole for the fixing member may be formed on the flange members 400*b*, 400*c*, etc. of the metal member, so that the metal member is strongly fixed to the body 100. In the insert molding process, melt plastic fills the hole, and thus the metal member may be strongly combined in the body 100.

One or more projection members may be formed on the metal member to more strongly combine the metal member in the body 100.

To use two separated sub metal members 400 and 402 is for locating the liner 102 in the metal member. It is impossible to insert the liner 102 in the metal member because a width of the flange member 102b or 102c of the liner 102 is greater than an inner space of the metal member, if the metal member is in a body. Accordingly, two separated sub metal members 400 and 402 are used to locate the liner 102 including the flange member 102b or 102c higher than the inner space of the metal member in the metal member.

Shortly, the sub metal members 400 and 402 may be included in the body 100 formed of the plastic through the insert molding, while two sub metal members 400 and 402 surround the liner 102. Here, the liner 102 may locate in the metal member.

Distortion may occur to a fitting due to a fixing force of a fixing member in a direction opposed to a fixed direction when a flange of the fitting is combined with a flange of a pipe through the fixing member, if the body surrounds directly a liner and a metal member does not surround the liner.

Distortion may not occur or be minimized to the fitting because a flange in the fitting is strengthened though the flange of the fitting is combined with a flange of a pipe through the fixing member, when the metal member is included in the body 100 formed of the plastic while the liner 102 is disposed in the metal member.

Of course, distortion may be prevented when the fitting is combined with the pipe, if the body is formed of metal and the liner is included in the body. However, it is difficult to process the body and manufacturing cost of the fitting may increase sharply. Additionally, corrosion may occur to the fitting and lifetime of the fitting may get shorter.

Accordingly, the body 100 in the fitting of the disclosure is formed of the plastic, wherein the metal member is formed in the body 100 to reinforce strength. In this case, it is sufficient not to process precisely the metal member and it is easy to process precisely the plastic. Hence, it is easy to process the fitting to have desired shape, manufacturing cost of the fitting may be reduced and the distortion may be minimized when the fitting is combined with the pipe or another fitting.

On the other hand, the flange member of the liner 102, the flange member of the metal member and the flange member of the body 100 form a flange. In view of the flange, a metal member is included in a plastic. As a result, distortion may be minimized though the flange of the fitting is combined with the flange of the pipe or a flange of another fitting.

In the above description, the metal member comprises two sub metal members 400 and 402 disposed symmetrically with the same shape. However, the metal member may be formed with three or more sub metal members. Here, the liner 102 may be disposed in the sub metal members and the sub metal members may be included in the body 100. The sub metal members may have the same shape or at least one of the sub metal members may have different shape.

For example, three sub metal members, which are separately disposed by 120° with the same shape, may surround the liner 102.

However, it is efficient that the metal member is formed with two sub metal members 400 and 402, considering the manufacturing process.

In an embodiment, the fitting may not include a liner. That is, the fitting may include a body and a metal member having a first sub metal member and a second metal member, without the liner.

Figure 7:
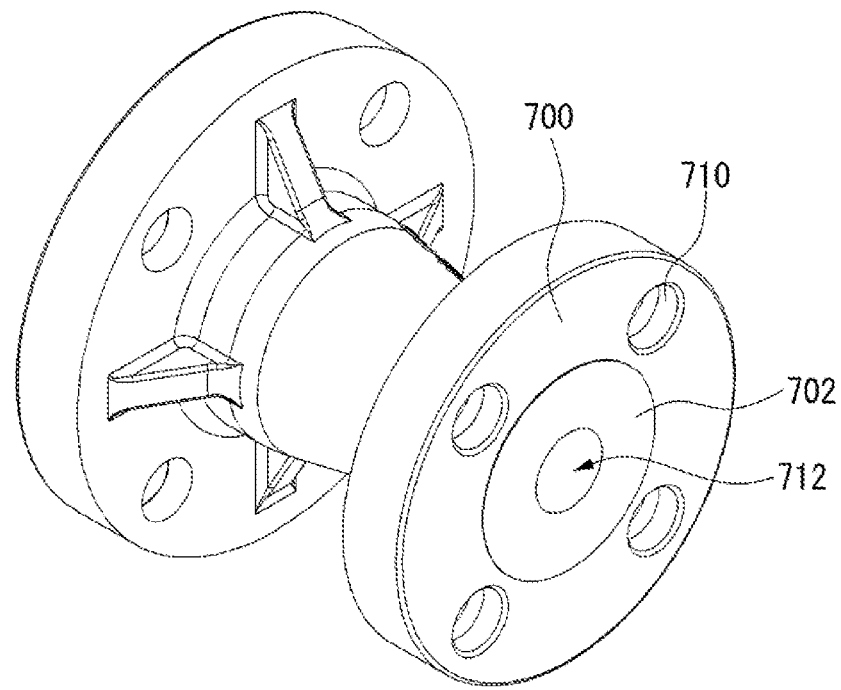
FIG. 7 and FIG. 8 are perspective views illustrating a reducer fitting according to an embodiment of the disclosure.
Figure 8:
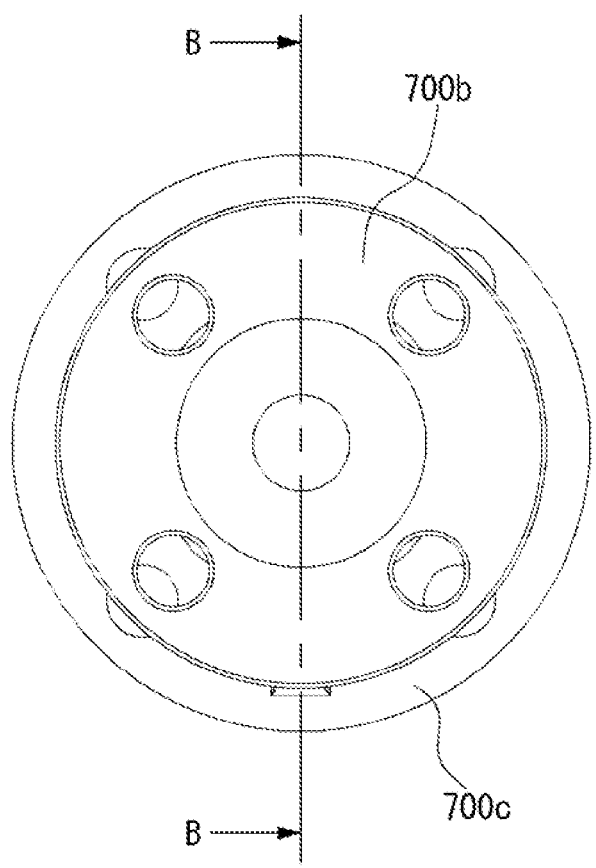
Figure 9:
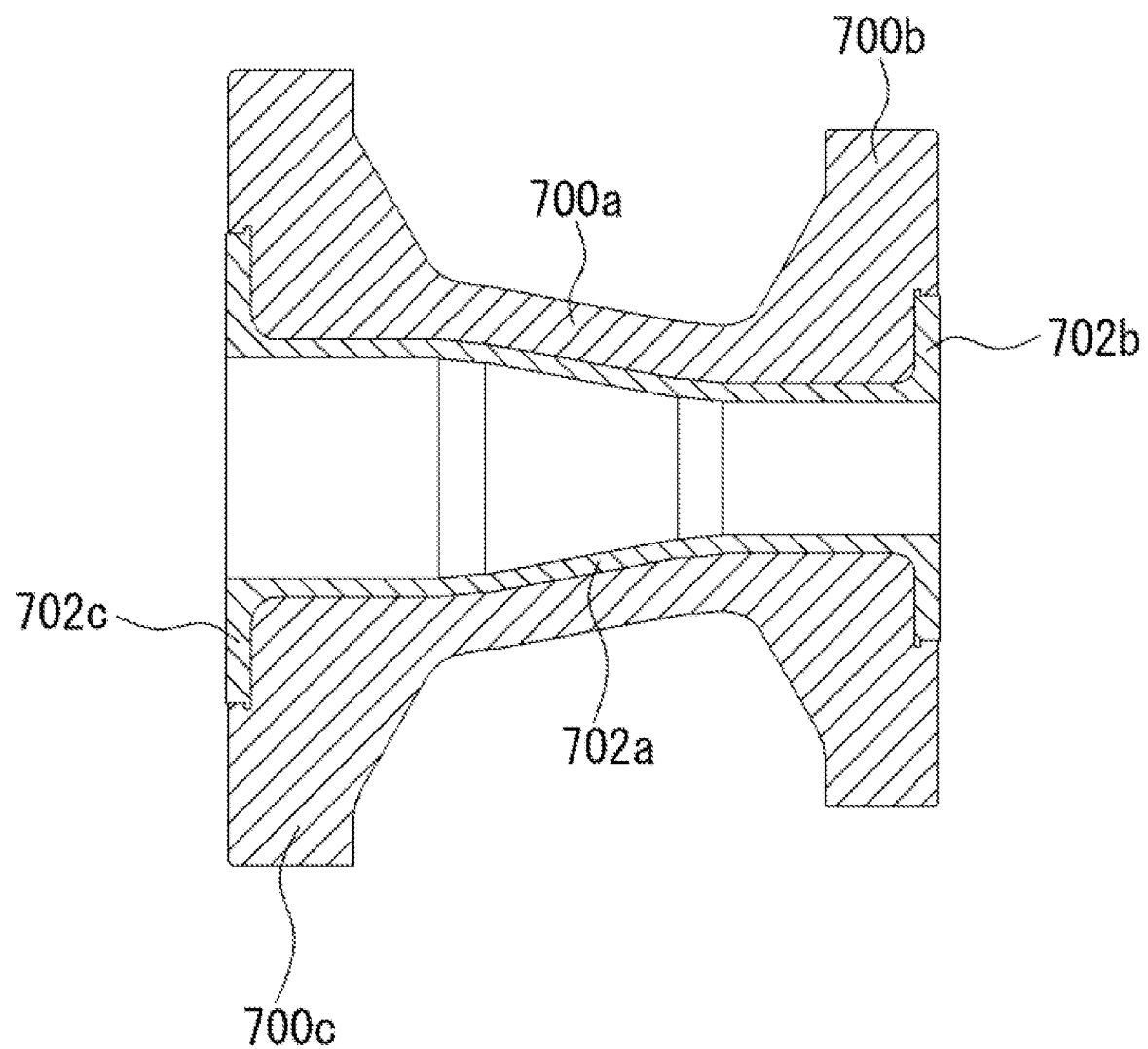
FIG. 9 is a sectional view illustrating a structure of the fitting taken along A-A line.
Figure 10:
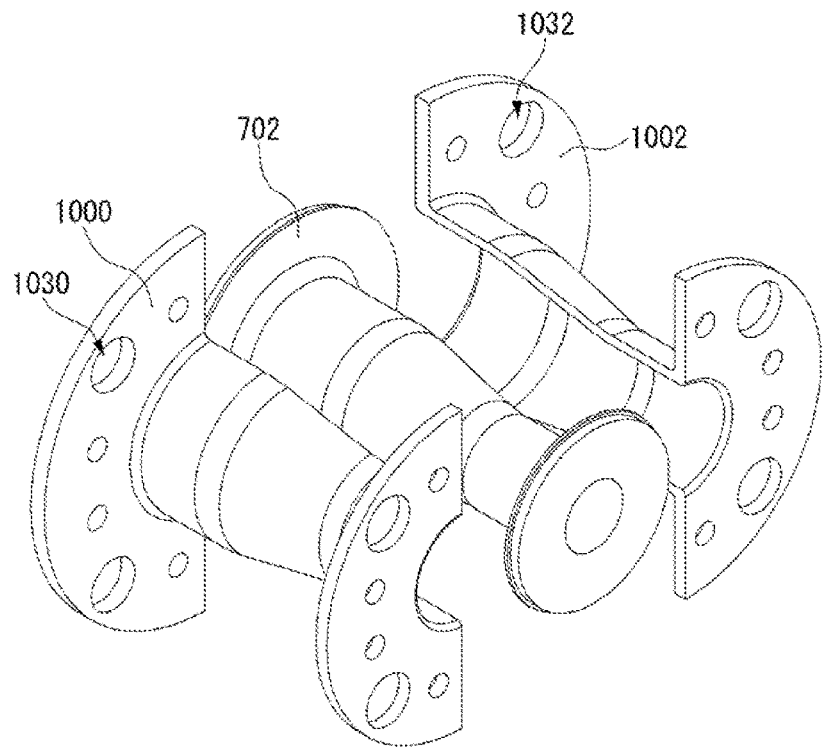
FIG. 10 is a view illustrating a combination process of a metal member in the fitting according to an embodiment of the disclosure.
Figure 11:
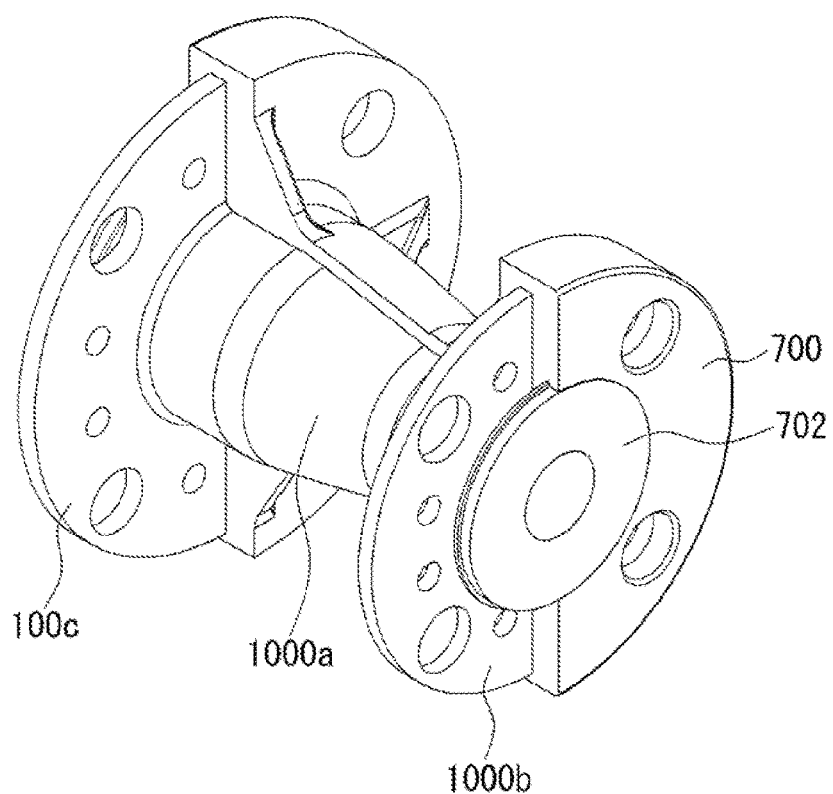
FIG. 11 is a view illustrating schematically a combination process of a body in the fitting according to an embodiment of the disclosure.

FIG. 7 and FIG. 8 are perspective views illustrating a reducer fitting according to another embodiment of the disclosure, and FIG. 9 is a sectional view illustrating a structure of the fitting taken along A-A line. FIG. 10 is a view illustrating a combination process of a metal member in the fitting according to one embodiment of the disclosure, and FIG. 11 is a view illustrating schematically a combination process of a body in the fitting according to one embodiment of the disclosure.

That is, the fitting of the disclosure has flanges disposed in right and left, unlike an elbow fitting where flanges are disposed up and down. Here, the flanges may have the same size or different size.

In FIG. 7 to FIG. 11, the fitting of the present embodiment may include a body 700, a liner 702 and a metal member having a first sub metal member 1000 and a second sub metal member 1002.

The body 700 may be in integral and include a body member 700a, a first body flange member 700b and a second body flange member 700c.

The body 700 covers the metal member and may be formed of plastic such as a super engineering plastic, etc. That is, the metal member is included in the body 700.

The body member 700a may be linearly formed as shown in FIG. 9.

The first body flange member 700b is formed at an end part of the body member 700a and is combined with a pipe or another fitting. Of course, the first body flange member 700b may be combined with every structure having a flange.

In an embodiment, at least one hole 710 is formed on the first body flange member 700b, a hole is formed on a flange of the pipe, and the flange of the first body flange member 700 may be combined with the flange of the pipe by passing a fixing member such as a bolt, etc. through the hole 710 of the first body flange member 700b and the hole of the flange of the pipe. As a result, the fitting may be combined with the pipe. Of course, a combination process of the fitting and another fitting is similar to the above combination process.

The second body flange member 700c is formed at the other end part of the body member 700a and is combined with a pipe or another fitting. The combination process is similar to the combination process of the first body flange member 700b.

The liner 702 locates in the body 700, and it may have a structure narrowed in a direction from the second liner flange member 702c to the first liner flange member 702b and be formed of fluorine resin.

The liner 702 includes a liner body member 702a, a first liner flange member 702b and a second liner flange member 702c. A fluid flow space 712 through which fluid flow may be formed in the liner 702.

The liner body member 702a locates in the body member 700a, and it may have a structure narrowed in a direction from the second liner flange member 702c to the first liner flange member 702b.

The first liner flange member 702b may have higher width than the liner body member 702a and be disposed in the first body flange member 700b. One side of the first liner flange member 702b may be exposed outside.

The second liner flange member 702c may have higher width than the liner body member 702a and be disposed in the second body flange member 700c. One side of the second liner flange member 702c may be exposed outside.

Additionally, the width of the second liner flange member 702c may be greater than that of the first liner flange member 702b.

The metal member may cover the liner 702 as shown in FIG. 10 and FIG. 11 and be included in the body 700. Here, a whole of the metal member may be covered by the body 700 and none part of the metal member may be exposed outside. That is, the metal member covers the liner 702, and a whole of the metal member may be included in the body 700.

In an embodiment, the metal member may include a first sub metal member 1000 and a second sub metal member 1002. For example, the metal member may include two sub metal members 1000 and 1002 with the same structure. However, the sub metal members 1000 and 1002 may be separated.

The first sub metal member 1000 may be in a body, cover a half of the liner 702 and include a first sub body member 1000a, a 1-1 sub flange member 1000b and a 1-2 sub flange member 1000c.

The first sub body member 1000a may cover half of the liner body member 702a and have a curve shape.

The 1-1 sub flange member 1000b may be connected to an end of the first sub body member 1000a and be disposed just beneath the first liner flange member 702b. Particularly, a groove curve line formed at a center of the 1-1 sub flange member 1000b may cover half of the liner body member 702a just beneath the first liner flange member 702b, wherein the groove curve line may have the same curvature as the liner body member 702a or similar curvature to the liner body member 702a.

In one embodiment, a width of the 1-1 sub flange member 1000b is higher than that of the first liner flange member 702b. As a result, at least part of the 1-1 sub flange member 1000b may be projected outside the first liner flange member 702b in a width direction while the 1-1 sub flange member 1000b supports the first liner flange member 702b, when the 1-1 sub flange member 1000b surrounds the liner body member 702a. Here, the first liner flange member 702b may be projected compared to the 1-1 sub flange member 1000b in a longitudinal direction.

On the other hand, the 1-1 sub flange member 1000b might surround directly the first liner flange member 702b. In this case, the fitting may have unstable structure because a space exists between the liner 702 and the metal member. Accordingly, it is effective that the 1-1 sub flange member 1000b surrounds the liner body member 702a just beneath the first liner flange member 702b.

At least one hole 1030 may be formed on the 1-1 sub flange member 1000b, a fixing member passing through the hole. That is, the fixing member passes the hole 710 of a first body flange member 700b and the hole 1030 of the 1-1 sub flange member 1000b when the fitting is combined with the pipe.

The 1-2 sub flange member 1000c may be connected to the other end of the first sub body member 1000a and be disposed just beneath the second liner flange member 702c. Particularly, a groove curve line formed at a center of the 1-2 sub flange member 1000c may surround half of the liner body member 702a just beneath the second liner flange member 702c, wherein the groove curve line may have the same curvature as the liner body member 702a or similar curvature to the liner body member 702a.

In one embodiment, a width of the 1-2 sub flange member 1000c is higher than that of the second liner flange member 702c. As a result, at least part of the 1-2 sub flange member 1000c may be projected outside the second liner flange member 702c in a width direction while the 1-2 sub flange member 1000c supports the second liner flange member 702c as shown in FIG. 11, when the 1-2 sub flange member 1000c surrounds the liner body member 702a. Here, the second liner flange member 702c may be projected compared to the 1-2 sub flange member 1000c in a longitudinal direction.

At least one hole may be formed on the 1-2 sub flange member 1000c, a fixing member passing through the hole. That is, the fixing member passes through the hole of a second body flange member 700c and the hole of the 1-2 sub flange member 1000c when the fitting is combined with the pipe.

The second sub metal member 1002 may be in a body, surround the other half of the liner 702 and include a second sub body member, a 2-1 sub flange member and a 2-2 sub flange member.

The second sub body member may surround the other half of the liner body member 702a.

The 2-1 sub flange member may be connected to an end of the second sub body member and be disposed just beneath the first liner flange member 702b. Particularly, a groove curve line formed at a center of the 2-1 sub flange member may surround the other half of the liner body member 702a just beneath the first liner flange member 702b, wherein the groove curve line may have the same curvature as the liner body member 702a or similar curvature to the liner body member 702a.

In one embodiment, a width of the 2-1 sub flange member is higher than that of the first liner flange member 702b. As a result, at least part of the 2-1 sub flange member may be projected outside the first liner flange member 702b in a width direction while the 2-1 sub flange member supports the first liner flange member 702b, when the 2-1 sub flange member surrounds the liner body member 702a. Here, the first liner flange member 702b may be projected compared to the 2-1 sub flange member in a longitudinal direction.

At least one hole 1032 may be formed on the 2-1 sub flange member, a fixing member passing through the hole. That is, the fixing member passes through the hole 710 of a first body flange member 700b and the hole of the 2-1 sub flange member when the fitting is combined with the pipe.

On the other hand, the 2-1 sub flange member may have a shape of doughnuts cut by half, end sections except the groove curve line may be contacted with end sections of the 1-1 sub flange member 1000b. That is, the metal member may surround the liner 702 while the end sections of the 1-1 sub flange member 1000b are contacted with the end sections of the 2-1 sub flange member. Here, the 1-1 sub flange member 1000b has a shape of doughnuts cut by half.

The 2-2 sub flange member may be connected to the other end of the second sub body member and be disposed just beneath the second liner flange member 702c. Particularly, a groove curve line formed at a center of the 2-2 sub flange member may surround the other half of the liner body member 702a just beneath the second liner flange member 702c, wherein the groove curve line may have the same curvature as the liner body member 702a or similar curvature to the liner body member 702a.

In one embodiment, a width of the 2-2 sub flange member is higher than that of the second liner flange member 702c. As a result, at least part of the 2-2 sub flange member may be projected outside the second liner flange member 702c in a width direction while the 2-2 sub flange member supports the second liner flange member 702c, when the 2-2 sub flange member surrounds the liner body member 702a.

Here, the second liner flange member 702c may be projected compared to the 2-2 sub flange member in a longitudinal direction.

At least one hole may be formed on the 2-2 sub flange member, a fixing member passing through the hole. That is, the fixing member passes through the hole of a second body flange member 700c and the hole of the 2-2 sub flange member 1000b when the fitting is combined with the pipe.

On the other hand, the 2-2 sub flange member may have a shape of doughnuts cut by half, end sections except the groove curve line may be contacted with end sections of the 1-2 sub flange member 1000c. That is, the metal member may surround the liner 702 while the end sections of the 1-2 sub flange member 1000c are contacted with the end sections of the 2-2 sub flange member. Here, the 1-2 sub flange member 1000c has a shape of doughnuts cut by half.

In a manufacturing process, the metal member may be formed in the body 700 by using an insert molding. Particularly, the metal member may be included in the body 700 and the liner 702 may be formed in the metal member by insert-molding a structure where the sub metal members 1000 and 1002 surround the liner 702 in plastic which is material of the body 700.

At least one hole other than the hole for the fixing member may be formed on the flange members 1000b, 1000c, etc. of the metal member, so that the metal member is strongly fixed to the body 700. In the insert molding process, melt plastic fills the hole, and thus the metal member may be strongly combined in the body 700.

One or more projection members may be formed on the metal member to more strongly combine the metal member in the body 700.

Shortly, the sub metal members 1000 and 1002 may be included in the body 700 formed of the plastic through the insert molding, while two sub metal members 1000 and 1002 surround the liner 702. Here, the liner 702 may locate in the metal member.

On the other hand, the flange member of the liner 702, the flange member of the metal member and the flange member of the body 700 form a flange. In view of the flange, a metal member is included in a plastic. As a result, distortion may be minimized though the flange of the fitting is combined with the flange of the pipe or a flange of another fitting.

In the above description, the metal member comprises two sub metal members 1000 and 1002 disposed symmetrically with the same shape. However, the metal member may be formed with three or more sub metal members. Here, the liner 702 may be disposed in the sub metal members and the sub metal members may be included in the body 700. The sub metal members may have the same shape or at least one of the sub metal members may have different shape.

In another embodiment, a fitting may not include a liner. That is, the fitting may include a body and a metal member having a first sub metal member and a second sub metal member, without the liner.

Figure 12:
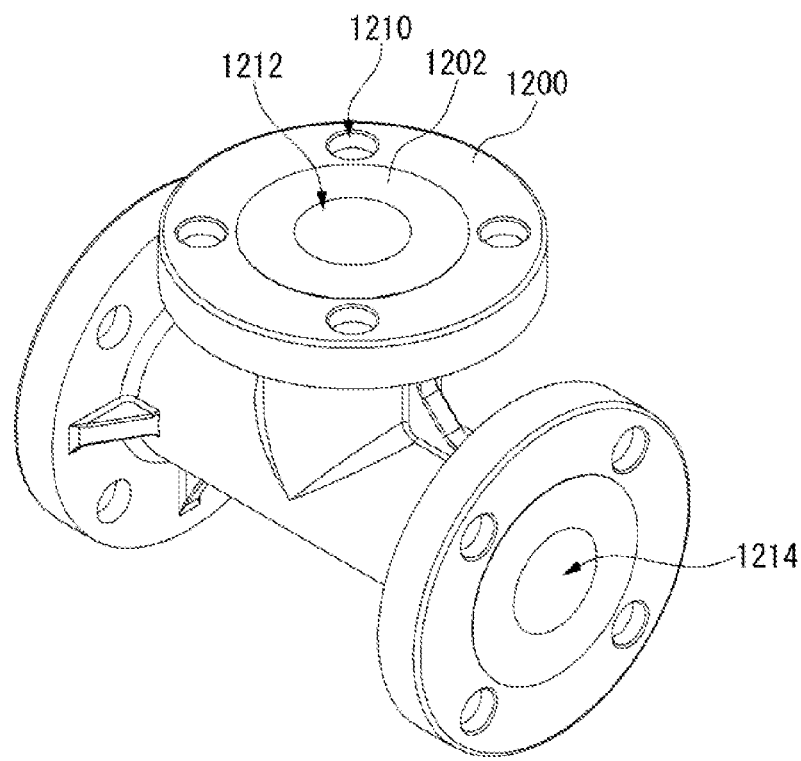
FIG. 12 is a perspective view illustrating a TEE fitting according to still another embodiment of the disclosure.
Figure 13:
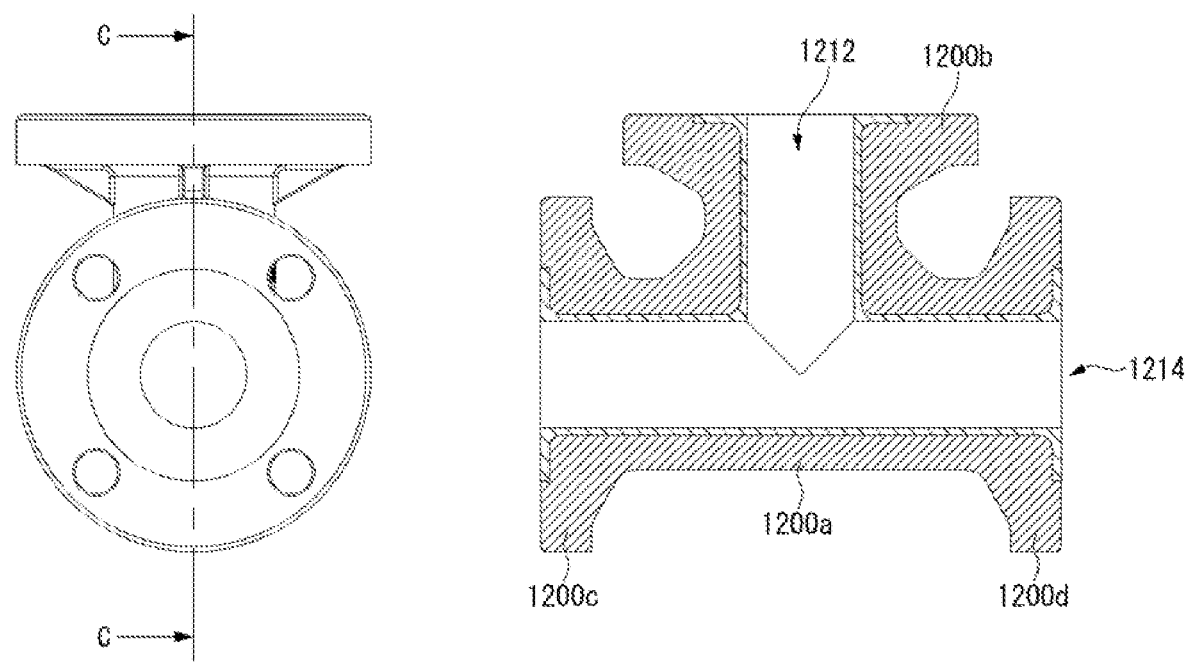
FIG. 13 is a view illustrating a section of the fitting in FIG. 12.
Figure 14:
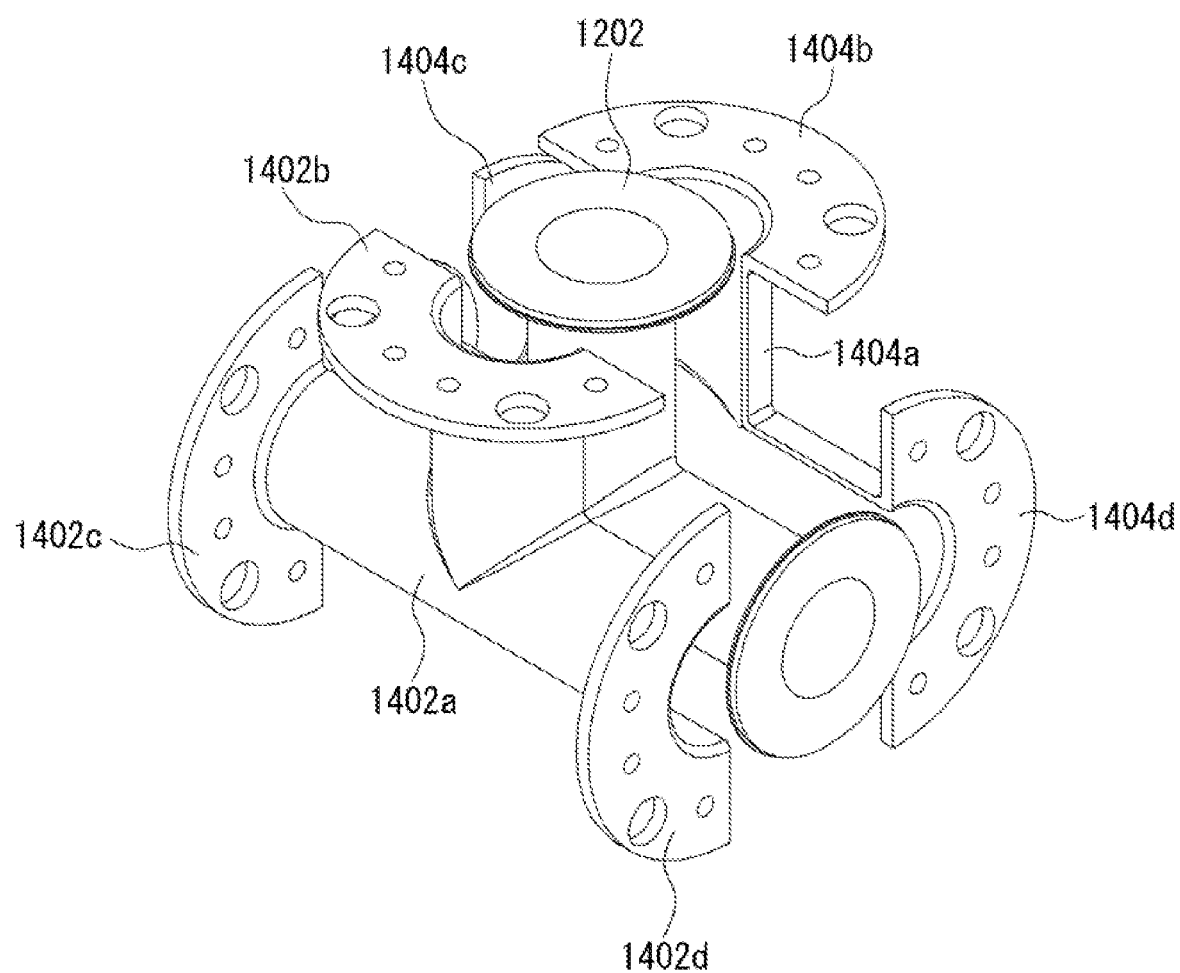
FIG. 14 is a view illustrating a combination process of a metal member in the fitting according to an embodiment of the disclosure.
Figure 15:
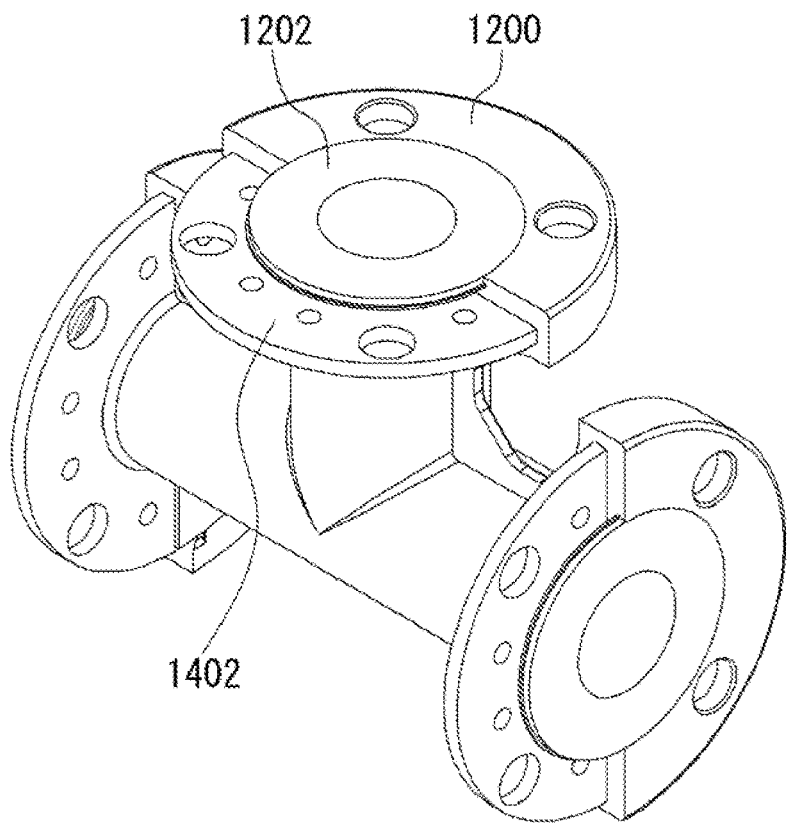
FIG. 15 is a view illustrating schematically a combination process of a body in the fitting according to an embodiment of the disclosure.

FIG. 12 is a perspective view illustrating a TEE fitting according to still another embodiment of the disclosure, and FIG. 13 is a view illustrating a section of the fitting in FIG. 12. FIG. 14 is a view illustrating a combination process of a metal member in the fitting according to one embodiment of the disclosure, and FIG. 15 is a view illustrating schematically a combination process of a body in the fitting according to one embodiment of the disclosure. The combination process in the fitting of the present embodiment is similar to that in above embodiments, and thus it will be described simply.

In FIG. 12 to FIG. 15, the fitting of the present embodiment has a T type structure and may include a body 1200, a liner 1202 and a metal member having a first sub metal member 1402 and a second sub metal member 1404.

The body 1200 may be in a body, be formed of super engineering plastic, etc., and include a body member 1200a, a first body flange member 1200b, a second body flange member 1200c and a third body flange member 1200d.

The body member 1200a may have a T type structure as shown in FIG. 12 and FIG. 13.

The first body flange member 1200b may be formed at one end part of the body member 1200a, at least one hole 1210 being formed on a part of the first body flange member 1200b for the purpose of combination with a pipe or another fitting through a fixing member.

The second body flange member 1200c may be formed at another end part of the body member 1200a and be vertically formed to the first body flange member 1200b.

The third body flange member 1200d may be formed at another end part of the body member 1200a, be vertically formed to the first body flange member 1200b and face to the second body flange member 1200c.

The liner 1202 may be disposed in the body 1200, and a fluid flow spaces 1212 and 1214 through which fluid flow may be formed in the liner 1202.

The liner 1202 has T shape corresponding to the shape of the body 1200, i.e. includes T type liner body member and liner flange members formed at end parts of the liner body member, and thus the fluid flow space 1212 and 1214 has also T shape. As a result, fluid inputted to e.g. the fluid flow space 1212 flows to both of the outlets and then outputted via the outlets.

The liner 1202 is disposed in the metal member. Particularly, the first sub metal member 1402 of the metal member may surround half of the liner 1202, and the second sub metal member 1404 may surround the other half of the liner 1202. Here, the sub metal members 1402 and 1404 may have T shape, respectively.

The first sub metal member 1402 may be in a body and include a first sub body member 1402a, a 1-1 sub flange member 1402b, a 1-2 sub flange member 1402c and a 1-3 sub flange member 1402d.

The second sub metal member 1404 may be in a body, face to the first sub metal member 1402 with the same structure as the first sub metal member 1402 and include a second sub body member 1404, a 2-1 sub flange member 1404b, a 2-2 sub flange member 1404c and a 2-3 sub flange member 1404d.

In an embodiment, a hole in which a fixing member is inserted and a hole in which melt plastic is filled when an insert molding is performed may be formed on the sub flange members 1402b, 1402c, 1402d, 1404b, 1404c and 1404d.

Each of the sub flange members 1402b, 1402c, 1402d, 1404b, 1404c and 1404d may surround corresponding liner body member just beneath the liner flange members, and it may have width higher than the liner flange members.

The sub flange members 1402b, 1402c, 1402d, 1404b, 1404c and 1404d may be covered by the body 1200, i.e. be included in the body 1200.

Briefly, the liner 1202 is disposed in the metal member including two sub metal members 1402 and 1404, and the body 1200 surrounds the sub metal members 1402 and 1404.

On the other hand, the liner flange member, the sub flange members 1402b, 1402c, 1402d, 1404b, 1404c or 1404d of the metal member and the flanges 1200b, 1200c or 1200d of the body 1200 form flanges. That is, the metal member is included in the flange member, and so distortion by the fixing member may be minimized.

In above description, two sub metal members are mentioned, but three or more metal members may surround the liner 1202.

In an embodiment, the fitting may not include the liner. In other words, the fitting may include the body and the metal member having the first sub metal member and the second sub metal member, without the liner.

Hereinafter, material of the body 100, 700 or 1200 will be described in detail. Numerical number of the body will be omitted for convenience of description.

The body may be formed by mixing a glass fiber with a Polyvinyl Chloride PVC, a polypropylene PP, a Poly Phenylene sulfide PPS, a Polyphthalamide PPA, a Polyamide PA6, a Polyamide PA66, a Polyketone POK or a Polyethylene PE. As a result, strength, impact resistance and mechanical feature of the body may be enhanced.

In an embodiment, the body may be formed by mixing a glass fiber and a carbon fiber with for example, a PVC, a PP, a PPS, a PPA, a PA6, a PA66, a POK or a PE. Accordingly, strength, impact resistance and mechanical feature of the body may be enhanced.

In still another embodiment, the body may be formed by mixing a glass fiber, a carbon fiber and a graphite fiber with for example, a PVC, a PP, a PPS, a PPA, a PA6, a PA66, a POK or a PE. Here, composition of the glass fiber, the carbon fiber and graphite fiber may be 20:10:5. As a result, strength, impact resistance and mechanical feature of the body may be enhanced.

Hereinafter, composition and an experimental result will be described.

In an embodiment, the body may be formed by mixing a PP with a glass fiber. Preferably, the glass fiber has a weight percent higher than 0 weight percent and less than 40 weight percent, and the PP has a weight percent higher than 60 weight percent. Experimental result is shown in following table 1.

TABLE 1

| embodiment | glass fiber weight percent | Tensile strength(Mpa@ 23° C.) [ASTM D638] |
|---|---|---|
| comparison | 0 | 25 |
| 1 | 10 | 54 |
| 2 | 15 | 59 |
| 3 | 20 | 78 |
| 4 | 30 | 83 |
| 5 | 40 | 94 |

It is verified through the above table 1 that tensile strength of the body when the body is formed by mixing the PP with the glass fiber is very greater than that of a body formed of only the PP. That is, mechanical property and chemical property may be enhanced. However, it is difficult to manufacture the body to have desired shape because an insert molding feature for manufacturing the body is deteriorated when the glass fiber has a weight percent higher than 40 weight percent.

In an embodiment, the body may be formed by mixing a PPS with a glass fiber. Preferably, the glass fiber has a weight percent higher than 0 weight percent and less than 40 weight percent, and the PPS has a weight percent higher than 60 weight percent. Experimental result is shown in following table 2.

TABLE 2

| embodiment | glass fiber weight percent | Tensile strength(Mpa@ 23° C.) [ASTM D638] |
|---|---|---|
| comparison | 0 | 70 |
| 1 | 30 | 140 |
| 2 | 40 | 200 |

It is verified through the above table 2 that tensile strength of the body when the body is formed by mixing the PPS with the glass fiber is very greater than that of a body formed of only the PPS. That is, mechanical property and chemical property may be enhanced, and thus light and strong body may be formed. However, it is difficult to manufacture the body to have desired shape because an insert molding feature for manufacturing the body is deteriorated when the glass fiber has a weight percent higher than 40 weight percent.

In still another embodiment, the body may be formed by mixing a PPA with a glass fiber. Preferably, the glass fiber has a weight percent higher than 0 weight percent and less than 55 weight percent, and the PPA has a weight percent higher than 45 weight percent. Experimental result is shown in following table 3.

TABLE 3

| embodiment | glass fiber weight percent | Tensile strength(Mpa@ 23° C.) [ASTM D638] |
|---|---|---|
| comparison | 0 | 105 |
| 1 | 25 | 170 |
| 2 | 35 | 210 |
| 3 | 45 | 250 |
| 4 | 55 | 270 |

It is verified through the above table 3 that tensile strength of the body when the body is formed by mixing the PPA with the glass fiber is very greater than that of a body formed of only the PPA. That is, mechanical property and chemical property may be enhanced, and thus light and strong body may be formed. However, it is difficult to manufacture the body to have desired shape because an insert molding feature for manufacturing the body is deteriorated when the glass fiber has a weight percent higher than 55 weight percent.

In still another embodiment, the body may be formed by mixing a PA6 with a glass fiber. Preferably, the glass fiber has a weight percent higher than 0 weight percent and less than 50 weight percent, and the PA6 has a weight percent higher than 50 weight percent. Experimental result is shown in following table 4.

TABLE 4

| embodiment | glass fiber weight percent | Tensile strength(Mpa@ 23° C.) [ASTM D638] |
|---|---|---|
| comparison | 0 | 70 |
| 1 | 15 | 125 |
| 2 | 20 | 145 |
| 3 | 30 | 170 |
| 4 | 33 | 180 |
| 5 | 35 | 185 |
| 6 | 40 | 192 |
| 7 | 45 | 200 |
| 8 | 50 | 220 |

It is verified through the above table 4 that tensile strength of the body when the body is formed by mixing the PA6 with the glass fiber is very greater than that of a body formed of only the PA6. That is, mechanical property and chemical property may be enhanced, and thus light and strong body may be formed. However, it is difficult to manufacture the body to have desired shape because an insert molding feature for manufacturing the body is deteriorated when the glass fiber has a weight percent higher than 50 weight percent.

In still another embodiment, the body may be formed by mixing a PA66 with a glass fiber. Preferably, the glass fiber has a weight percent higher than 0 weight percent and less than 50 weight percent, and the PA66 has a weight percent higher than 50 weight percent. Experimental result is shown in following table 5.

TABLE 5

| embodiment | glass fiber weight percent | Tensile strength(Mpa@ 23° C.) [ASTM D638] |
|---|---|---|
| comparison | 0 | 80 |
| 1 | 25 | 165 |
| 2 | 30 | 186 |
| 3 | 33 | 196 |
| 4 | 35 | 200 |
| 5 | 50 | 245 |

It is verified through the above table 5 that tensile strength of the body when the body is formed by mixing the PA66 with the glass fiber is very greater than that of a body formed of only the PA66. That is, mechanical property and chemical property may be enhanced, and thus light and strong body may be formed. However, it is difficult to manufacture the body to have desired shape because an insert molding feature for manufacturing the body is deteriorated when the glass fiber has a weight percent higher than 50 weight percent.

In still another embodiment, the body may be formed by mixing a POK with a glass fiber. Preferably, the glass fiber has a weight percent higher than 0 weight percent and less than 40 weight percent, and the POK has a weight percent higher than 60 weight percent. Experimental result is shown in following table 6.

TABLE 6

| embodiment | glass fiber weight percent | Tensile strength(Mpa@ 23° C.) [ASTM D638] |
|---|---|---|
| comparison | 0 | 60 |
| 1 | 15 | 100 |
| 2 | 20 | 125 |
| 3 | 30 | 140 |
| 4 | 40 | 165 |

It is verified through the above table 6 that tensile strength of the body when the body is formed by mixing the POK with the glass fiber is very greater than that of a body formed with only the POK. That is, mechanical property and chemical property may be enhanced, and thus light and strong body may be formed. However, it is difficult to manufacture the body to have desired shape because an insert molding feature for manufacturing the body is deteriorated when the glass fiber has a weight percent higher than 40 weight percent.

Figure 16:
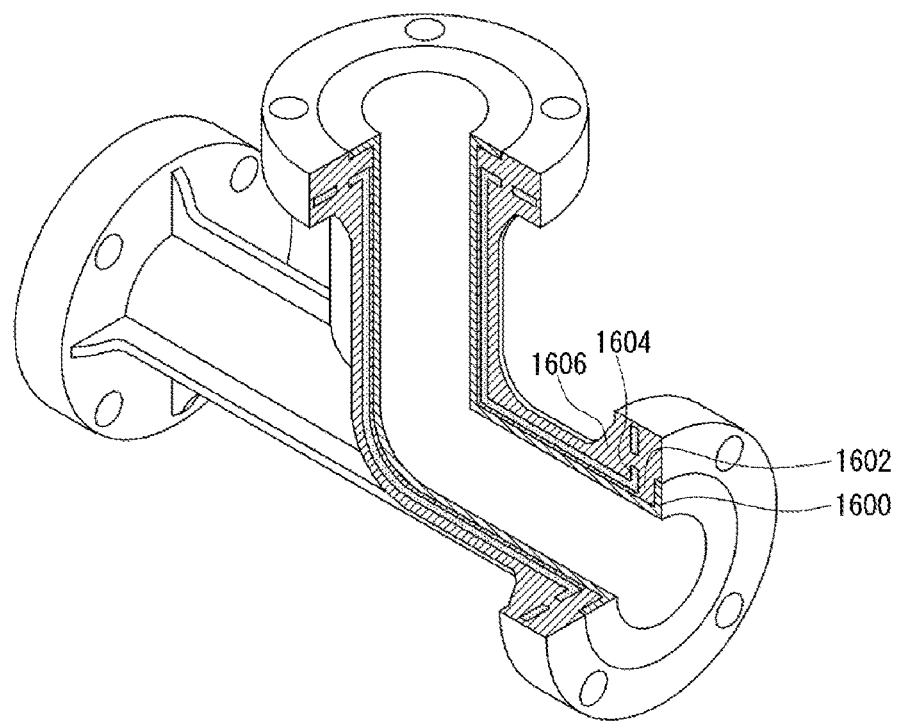
FIG. 16 is a view illustrating a fitting according to still another embodiment of the disclosure.

FIG. 16 is a view illustrating a fitting according to still another embodiment of the disclosure. FIG. 16 shows a T type fitting, but structure in FIG. 16 may be applied to other fittings.

In FIG. 16, a liner 1600, a resin layer 1602, a metal member 1604 including at least two sub metal members and a body 1606 may be sequentially disposed.

That is, unlike other embodiments, in the present embodiment, the resin layer 1602 may be disposed between the liner 1600 and the metal member 1604.

In one embodiment, the resin layer 1602 may be formed of the same material as the body 1606. The material of the body in the above embodiment may be used as the material of the body 1606.

If molding after inserting a structure where the sub metal members surround the liner 1600 in a plastic corresponding to the material of the body 1606, melted plastic permeates through a space between the liner 1600 and the metal member 1604 because a space exists between the sub metal members. As a result, the resin layer 1602 may be formed between the liner 1600 and the metal member 1604.

A hole may be formed at a part of the metal member 1604 so that the melted plastic is easily permeated between the liner 1600 and the metal member 1604.

The structure where the resin layer is formed between the liner and the metal member may be applied to other embodiments.

The embodiments of the disclosure described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. A fitting comprising:
a metal member configured to have at least two sub metal members;
a liner; and
a body,
wherein the sub metal members are included in the body, and the body is formed of plastic,
wherein the sub metal members surround the liner, a fluid flow space through which fluid flows is formed in the liner, the liner is formed of fluorine resin and includes a liner body member and a liner flange member formed at an end part of the liner body member, at least one of the sub metal members includes a sub body member and a sub flange member formed at an end part of the sub body member, the body includes a body member and a body flange member formed at an end part of the body member,
wherein part of the sub flange member is projected outside the liner flange member in a width direction, a diameter of the sub flange member is larger than a diameter of the liner flange member, and the sub flange member is included in the body flange member,
wherein at least one first hole into which a fixing member is inserted to combine the fitting with a pipe and at least one second hole in which melt plastic is filled when an insert molding is performed are formed on the sub flange member.

2. The fitting of claim 1,
wherein
a width of the sub flange member is greater than a width of the liner flange member, and the sub flange member surrounds the liner body member just beneath the liner flange member.

3. The fitting of claim 2, wherein the liner flange member is projected compared to the sub flange member in a longitudinal direction.

4. The fitting of claim 1, wherein the liner flange member, the sub flange member and the body flange member form one flange, and the one flange is combined with a flange of a pipe or a flange of another fitting, and wherein a diameter of the body flange member is larger than a diameter of the liner flange member.

5. The fitting of claim 1, wherein the sub metal members surround whole of the liner body member, the sub flange member is shaped as a semicircle, and a groove curve line of the sub flange member covers a half of the liner body member.

6. The fitting of claim 1, wherein a resin layer is formed between the liner and the metal member,
   and wherein material of the resin layer is identical to material of the body.

7. The fitting of claim 1, wherein the fitting is an elbow fitting, a reducer fitting or a TEE fitting.

* * * * *